(12) United States Patent
Mirakyan et al.

(10) Patent No.: US 8,697,610 B2
(45) Date of Patent: *Apr. 15, 2014

(54) WELL TREATMENT WITH COMPLEXED METAL CROSSLINKERS

(75) Inventors: Andrey Mirakyan, Houston, TX (US);
Michael D. Parris, Richmond, TX (US);
Carlos Abad, Richmond, TX (US);
Yiyan Chen, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 491 days.

This patent is subject to a terminal disclaimer.

(21) Appl. No.: 12/116,730

(22) Filed: May 7, 2008

(65) Prior Publication Data

US 2008/0280790 A1    Nov. 13, 2008

Related U.S. Application Data

(60) Provisional application No. 60/928,942, filed on May 11, 2007.

(51) Int. Cl.
*C09K 8/04* (2006.01)
*C09K 8/68* (2006.01)
*C09K 8/528* (2006.01)
*C23F 11/18* (2006.01)
*E21B 43/25* (2006.01)

(52) U.S. Cl.
USPC ........... 507/129; 507/211; 507/237; 507/271; 507/273; 166/307

(58) Field of Classification Search
USPC ........... 507/129, 211, 271, 273, 237; 166/307
See application file for complete search history.

(56) References Cited

U.S. PATENT DOCUMENTS

| 3,058,909 | A | 10/1962 | Kern |
| 3,301,723 | A | 1/1967 | Chrisp |
| 3,692,676 | A | 9/1972 | Culter et al. |
| 3,888,312 | A | 6/1975 | Tiner et al. |
| 3,937,283 | A | 2/1976 | Blauer et al. |
| 3,974,077 | A | 8/1976 | Free |
| 4,148,812 | A | 4/1979 | Rubino et al. |
| 4,460,751 | A | 7/1984 | Hanlon et al. |

(Continued)

FOREIGN PATENT DOCUMENTS

| EP | 92755 A1 | 11/1983 |
| EP | 0 390 279 B1 | 5/1993 |

(Continued)

OTHER PUBLICATIONS

Harry, et al., "Rheological Responses to Variations in Aqueous-Based Zirconium Crosslinker Chemistry", SPE 37280, 1997, pp. 669-674.

(Continued)

*Primary Examiner* — Aiqun Li
(74) *Attorney, Agent, or Firm* — Jeremy D. Tillman; Rachel Greene; Tim Curington

(57) ABSTRACT

Disclosed are compositions and methods for treating subterranean formations, in particular, oilfield stimulation compositions and methods using polymer viscosified fluid crosslinked with metal complexes with amino and/or phosphonic acids to provide an increased crosslinking temperature and a low pH sensitivity. The metal complexes can be used with borate crosslinkers to provide continuous viscosification as the temperature is increased.

27 Claims, 3 Drawing Sheets

(56) References Cited

U.S. PATENT DOCUMENTS

| | | | |
|---|---|---|---|
| 4,477,360 A | 10/1984 | Almond | |
| 4,480,696 A | 11/1984 | Almond et al. | |
| 4,514,309 A | 4/1985 | Wadhwa | |
| 4,552,674 A | 11/1985 | Brown et al. | |
| 4,579,670 A | 4/1986 | Payne | |
| 4,604,218 A * | 8/1986 | Dawson | 507/222 |
| 4,627,495 A | 12/1986 | Harris et al. | |
| 4,693,885 A | 9/1987 | Bommer et al. | |
| 4,780,223 A * | 10/1988 | Baranet et al. | 507/244 |
| 4,885,103 A | 12/1989 | Putzig et al. | |
| 4,946,604 A | 8/1990 | Smith | |
| 4,960,527 A | 10/1990 | Penny | |
| 5,165,479 A | 11/1992 | Harris et al. | |
| 5,217,632 A | 6/1993 | Sharif | |
| 5,259,455 A | 11/1993 | Nimerick et al. | |
| 5,330,005 A | 7/1994 | Card et al. | |
| 5,420,174 A | 5/1995 | Dewprashad | |
| 5,439,059 A | 8/1995 | Harris et al. | |
| 5,497,830 A | 3/1996 | Boles | |
| 5,521,257 A | 5/1996 | Ross | |
| 5,529,122 A | 6/1996 | Thach | |
| 5,551,516 A | 9/1996 | Norman et al. | |
| 5,575,335 A | 11/1996 | King | |
| 5,624,886 A | 4/1997 | Dawson | |
| 5,650,379 A | 7/1997 | Sydansk | |
| 5,895,644 A | 4/1999 | Albanese et al. | |
| 6,177,385 B1 | 1/2001 | Nimerick | |
| 6,209,646 B1 | 4/2001 | Reddy | |
| 6,214,773 B1 | 4/2001 | Harris et al. | |
| 6,227,295 B1 | 5/2001 | Mitchell et al. | |
| 6,239,183 B1 | 5/2001 | Farmer et al. | |
| 6,310,008 B1 | 10/2001 | Rietjens | |
| 6,419,016 B1 | 7/2002 | Reddy | |
| 6,435,277 B1 | 8/2002 | Qu et al. | |
| 6,439,310 B1 | 8/2002 | Scott, III | |
| 6,482,866 B1 | 11/2002 | Dahayanake et al. | |
| 6,488,091 B1 | 12/2002 | Weaver | |
| 6,506,710 B1 | 1/2003 | Hoey et al. | |
| 6,703,352 B2 | 3/2004 | Dahayanake et al. | |
| 6,794,340 B2 | 9/2004 | Nguyen | |
| 6,810,959 B1 | 11/2004 | Qu et al. | |
| 6,844,296 B2 | 1/2005 | Dawson et al. | |
| 7,082,995 B2 | 8/2006 | Hanes, Jr. | |
| 7,122,690 B1 | 10/2006 | Putzig | |
| 7,287,593 B2 | 10/2007 | Hutchins et al. | |
| 7,299,876 B2 | 11/2007 | Lord et al. | |
| 7,303,018 B2 | 12/2007 | Cawiezel et al. | |
| 2002/0160920 A1 | 10/2002 | Dawson | |
| 2003/0114539 A1 | 6/2003 | Weaver | |
| 2003/0166471 A1 | 9/2003 | Samuel | |
| 2003/0236171 A1 | 12/2003 | Nguyen | |
| 2003/0236173 A1 | 12/2003 | Dobson et al. | |
| 2004/0048750 A1 * | 3/2004 | Dawson et al. | 507/100 |
| 2004/0209780 A1 * | 10/2004 | Harris et al. | 507/117 |
| 2005/0043454 A1 * | 2/2005 | Ushida et al. | 524/241 |
| 2005/0077044 A1 | 4/2005 | Qu et al. | |
| 2006/0032636 A1 | 2/2006 | Lord et al. | |
| 2006/0225884 A1 | 10/2006 | Harris et al. | |
| 2006/0229213 A1 | 10/2006 | Harris et al. | |
| 2006/0243449 A1 | 11/2006 | Welton | |
| 2007/0087940 A1 | 4/2007 | Qu et al. | |
| 2007/0187642 A1 | 8/2007 | Putzig | |
| 2008/0280790 A1 | 11/2008 | Mirakyan et al. | |
| 2008/0287323 A1 | 11/2008 | Li et al. | |
| 2009/0145607 A1 | 6/2009 | Li | |
| 2009/0181865 A1 | 7/2009 | Dessinges et al. | |

FOREIGN PATENT DOCUMENTS

| | | | |
|---|---|---|---|
| EP | 0 282 253 B1 | | 6/1994 |
| EP | 1 398 459 A2 | | 3/2004 |
| GB | 2108122 A | * | 5/1983 |
| WO | 9926598 A1 | | 6/1999 |
| WO | 0034382 A1 | | 6/2000 |
| WO | 03050387 A2 | | 6/2003 |
| WO | 2008068467 A1 | | 6/2008 |

OTHER PUBLICATIONS

Omari, A., "Gelation Control of the Scleroglucan-Zirconium Systems using Oxyacids", Polyer, vol. 36, No. 22, Elsevier Science Ltd., 1995, pp. 4263-4265.

Rose, et al., "Aqueous Zirconium Complexes for Gelling Polymers. A Combined X-ray Absorption Spectroscopy and Quantum Mechanical Study", J. Phys. Chem. B, 2003, 107 (13), Mar. 7, 2003, pp. 2910-2920.

Sax, N. Irving, "Hawley's Condensed Chemical Dictionary", 11th Edition, Published by John Wiley & Sons, Inc 1987, 1987, p. 888.

Wiley, John, et al., "Oilfield Applications", Encyclopedia of Polymer Science and Engineering, vol. 10, 1987, pp. 328-366.

Yaritz, et al., "Development of a Dual Crosslinker Fracturing Fluid System", SPE 38959, 1997.

Agent's English translation of Office Action dated Sep. 16, 2013 for Chinese Patent Application No. 200880024134.X, 1 page.

ISO 13503-1:2003, "Petroleum and natural gas industries—Completion fluids and materials—Part 1: Measurement of viscous properties of completion fluids", ISO.

* cited by examiner

WELL TREATMENT WITH COMPLEXED METAL CROSSLINKERS

CROSS REFERENCE TO RELATED APPLICATION

This application claims priority to and the benefit of U.S. 60/928,942, filed May 11, 2007.

BACKGROUND OF THE INVENTION

The statements in this section merely provide background information related to the present disclosure and may not constitute prior art.

This invention relates to compositions and methods for treating subterranean formations, in particular, oilfield stimulation compositions and methods using polymer crosslinked with metal complexes to viscosity the treatment fluid.

High volumes of formation fracturing and other well treatment fluids are commonly thickened with polymers such as guar gum, the viscosity of which is greatly enhanced by crosslinking with a metal such as chromium aluminum, hafnium, antimony, etc., more commonly a Group 4 metal such as zirconium or titanium. In reference to Periodic Table "Groups," the new IUPAC numbering scheme for the Periodic Table Groups is used as found in HAWLEY'S CONDENSED CHEMICAL DICTIONARY, p. 888 (11th ed. 1987).

It is well known that metal-crosslinked polymer fluids can be shear-sensitive after they are crosslinked. In particular, exposure to high shear typically occurs within the tubulars during pumping from the surface to reservoir depth, and can cause an undesired loss of fluid viscosity and resulting problems such as screenout. As used herein, the term "high shear" refers to a shear rate of 500/second or more. The high-shear viscosity loss in metal-crosslinked polymer fluids that can occur during transit down the wellbore to the formation is generally irreversible and cannot be recovered. We use the term "persistent gels" herein to refer to such irreversibly crosslinked aqueous polymers.

High shear sensitivity of the metal crosslinked fluids can sometimes be addressed by delaying the crosslinking of the fluid so that it is retarded during the high-shear conditions and onset does not occur until the fluid has exited the tubulars. Because the treatment fluid is initially cooler than the formation and is usually heated to the formation temperature only after exiting the tubulars, some delaying agents work by increasing the temperature at which gelation takes place. Bicarbonate and lactate are examples of delaying agents that are known to increase the gelling temperatures of the metal crosslinked polymer fluids. Although these common delaying agents make fluids less sensitive to high shear treatments, they may at the same time result in a decrease in the ultimate fluid viscosity. Also, the common delaying agents may not adequately increase the gelation temperature for the desired delay, especially where the surface fluid mixing temperature is relatively high or the fluid is heated too rapidly during injection.

The affinity of a ligand to a metal can depend on various conditions, e.g., temperature, pressure, pH, concentrations of the metal and ligand, etc. The data on many metal/ligand binding constants can be found in open literature, for example, R. M. Smith and A. E. Martell, "Critical Stability Constants," Plenum Press, New York (1989).

Ligands such as triethanolamine, bicine (N,N-bis(2-hydroxyethyl)glycine), lactate, etc., have been used to form metallic complexes yielding aqueous gels of moderate viscosity at the downhole pH and temperature conditions encountered. Bicine and other N-hydroxyalkyl amino acid ligands are disclosed for example in U.S. Pat. No. 4,885,103, U.S. Pat. No. 7,122,690 and US 2007-187,642. Ligands such as bicine have been proposed for use with zirconium as delayed crosslinking agents. However, these ligands can be too strong binding and can result in crosslinking temperatures that are too high in some applications. If the crosslinking is delayed too much, the treatment fluid may not be sufficiently viscosified to initiate and propagate a fracture, or to carry proppant, for example, which can result in screenout and treatment failure.

Another issue with some crosslink delay ligands such as bicine is that they may be sensitive to small pH changes. Small changes in pH, which can occur for a number of reasons during well treatment, can result in dramatic lowering of the crosslinking temperature and premature crosslinking leading to excessive pumping pressures and shear-induced viscosity losses, or in a dramatic increase in the crosslinking temperature and excessive delay of crosslinking leading to screenout or treatment failure.

In some prior art treatment systems, borate crosslinkers have been used in conjunction with metal crosslinkers, e.g. U.S. Pat. No. 4,780,223. In theory, the borate crosslinker can gel the polymer fluid at a low temperature through a reversible crosslinking mechanism that can be broken by exposure to high shear, but can repair or heal after the high shear condition is removed. The shear-healing borate crosslinker can then be used to thicken the fluid during high shear such as injection through the wellbore while the irreversible metal crosslinking is delayed until the high shear condition is passed. A high pH, e.g. 9 to 12 or more, is usually used to effect borate crosslinking, and in some instances as a means to control the borate crosslinking. For example, the pH and/or the borate concentration may be adjusted on the fly in response to pressure friction readings during the injection so that the borate crosslinking occurs near the exit from the tubulars in the wellbore. The metal crosslinker must of course be suitable for use at these pH conditions and must not excessively interfere with the borate crosslinking.

A new way to delay the onset of crosslinking of metal crosslinked polymer fluids, without risk of compromising the fluid performance, is needed. Desirably, the onset of crosslinking would be insensitive or only moderately sensitive to pH changes and compatible with borate crosslinkers.

Zirconium-amino acid complexes are known in antiperspirant actives in the form of gels without a crosslinked polymer and/or in anhydrous systems where they are not used to viscosity aqueous fluids. For example, U.S. Pat. No. 4,148,812 discloses a method of preparing basic zirconium-amino acid complexes for antiperspirant formulations, consisting essentially of reacting a water soluble amino acid salt such as sodium glycinate with a water soluble zirconium salt to form a precipitate comprising a gel. The zirconium complex gel is in turn reacted with aluminum compounds to form the antiperspirant active. U.S. Pat. No. 5,895,644 and WO 1999026598 disclose an anhydrous gel used in an antiperspirant stick composition, wherein the anhydrous gel comprises dibenzylidene sorbitol (DBS), derivatized guar such as hydroxypropyl guar, and a solvent such as alcohol or glycol that does not react in the presence of DBS with an antiperspirant active salt such as aluminum/zirconium salts complexed with a neutral amino acid such as glycine. None of these references disclose a hydrated polymer crosslinked in an aqueous medium with a zirconium-amino acid complex as a delayed viscosity agent.

SUMMARY OF THE INVENTION

Disclosed are well treatment fluids prepared with binding ligands that can be used to form complexes with the crosslinking metals in aqueous polymer-viscosified systems, and methods to increase the gel cross-linking temperature. The binding ligands are carboxylic acids having an amine- or phosphorus-containing moiety, which form moderately strong complexes with metal and require an elevated temperature to allow the metal to crosslink with the hydrated polymer. In an embodiment the binding ligand is selected from amino carboxylic acids and phosphono carboxylic acids.

In one embodiment a method of treating a subterranean formation penetrated by a well bore comprises the steps of: (a) mixing into an aqueous mixture a crosslinkable, hydratable polymer and a delayed crosslinking agent, in amounts effective to obtain an aqueous mixture that can form a persistent gel at a crosslinking condition comprising an onset temperature of at least 40° C. and a pH sensitivity slope (pHSS) as defined below of 30° C. per pH unit or less for at least one pH unit range within a pH range from 8.5 to 12.5; (b) injecting the aqueous mixture into the well bore; (c) gelling the aqueous mixture at the persistent crosslinking condition. The crosslinking agent is a complex comprising a Group 4 metal and a first ligand selected from the group consisting of amino and phosphono acids, and salts and derivatives thereof.

In an embodiment, the persistent crosslinking condition can include an onset temperature less than 60° C. and a pH between 10 and 10.5. The pHSS is preferably from 5° C. per pH unit to 25° C. per pH unit. One embodiment comprises adjusting the pH of the aqueous mixture by introducing a pH adjusting compound to control a temperature at which the gelling occurs in step (c).

In an embodiment, the first ligand has from 2 to 40 carbon atoms and comprises an α-amino acid, an α-amino acid derivative, or a salt of an α-amino acid of the formula:

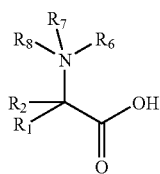

wherein $R_1$ and $R_2$ are independently selected from hydrogen and hydrocarbyl optionally containing a heteroatom, or together can form a substituted or unsubstituted cycloaliphatic bridge optionally containing a heteroatom; $R_6$ is hydrogen (forming an ammonium group) or a lone electron pair; and $R_7$ and $R_8$ are independently selected from hydrogen and substituted or unsubstituted aliphatic hydrocarbyl, or with one of $R_1$ and $R_2$ can form a substituted or unsubstituted cycloaliphatic bridge optionally containing a heteroatom.

In one embodiment of the α-amino acid, there is the proviso that when both $R_1$ and $R_2$ are hydrogen, $R_7$ and $R_8$ are selected from hydrogen and substituted or unsubstituted aliphatic hydrocarbyl other than hydroxyalkyl. In an alternate embodiment, $R_1$, $R_2$, $R_7$ and $R_8$ are selected from hydrogen and substituted or unsubstituted aliphatic hydrocarbyl other than hydroxyalkyl. Alternatively or additionally, $R_7$ and $R_8$ can both be hydrogen. In a further alternative or additional embodiment, at least one of $R_1$ and $R_2$ is carboxyalkyl, e.g. the ligand is an alpha amino dicarboxylic or tricarboxylic acid. Preferably, the first ligand is derived from aspartic acid, glutamic acid or a combination thereof.

In another embodiment, the first ligand has from 3 to 40 carbon atoms and comprises a β-amino acid, a β-amino acid derivative or a salt of a β-amino acid of the formula:

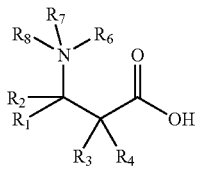

wherein $R_1$ and $R_2$ are independently selected from hydrogen and hydrocarbyl optionally containing a heteroatom, or together can form a substituted or unsubstituted cycloaliphatic bridge optionally containing a heteroatom; $R_3$ and $R_4$ are selected from hydrogen and hydrocarbyl; $R_6$ is hydrogen (forming an ammonium group) or a lone electron pair; and $R_7$ and $R_8$ are independently selected from hydrogen and substituted or unsubstituted aliphatic hydrocarbyl, or with one of $R_1$ and $R_2$ can form a substituted or unsubstituted cycloaliphatic bridge optionally containing a heteroatom.

In an embodiment of the β-amino acid, there is the proviso that $R_1$, $R_2$, $R_3$, $R_4$, $R_7$ and $R_8$ are selected from hydrogen and substituted or unsubstituted aliphatic hydrocarbyl other than hydroxyalkyl. Alternatively or additionally, $R_7$ and $R_8$ can both be hydrogen. In a further alternative or additional embodiment, at least one of $R_1$, $R_2$, $R_3$ and $R_4$ is carboxyalkyl, e.g. the ligand is a beta amino dicarboxylic or tricarboxylic acid. In another embodiment, the first ligand is derived from beta-alanine In an additional embodiment, the first ligand has from 2 to 40 carbon atoms and comprises a phosphono carboxylic acid, a phosphono carboxylic acid derivative or a salt of a phosphono carboxylic acid of the formula:

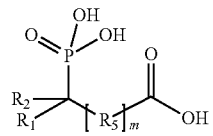

wherein $R_1$ and $R_2$ are independently selected from hydrogen and hydrocarbyl optionally containing a heteroatom, or together can form a substituted or unsubstituted cycloaliphatic bridge optionally containing a heteroatom; and m is 0 or 1 and when m is 1, $R_5$ is substituted or unsubstituted aliphatic alkylene. In another embodiment, the first ligand is derived from phosphonoacetic acid.

In an embodiment, the Group 4 metal is titanium or zirconium. The Group 4 metal can present in a concentration between 10 and 500 ppm by weight of the liquid phase of the aqueous mixture. Further, the complex can have a molar ratio of the metal to the first ligand from 1:1 to about 1:6. The complex can also have a second ligand selected from: alkanolamine (e.g., diethanolamine, triethanolamine), alkoxide, and α-hydroxyacid derivatives, wherein a molar ratio of the metal to the second ligand is from 1:1 to about 1:10.

The crosslinkable polymer in an embodiment can be selected from the group consisting of polysaccharides, such as for example, ionically modified galactomannan, cellulose, starch and the like.

In an embodiment, the method can include introducing proppant into the aqueous mixture, e.g. in a fracturing treatment. In various embodiments, the method can also include introducing a thermal stabilizer, a clay stabilizer, a surfactant, or a combination thereof into the aqueous mixture.

In an embodiment, the method can comprise introducing into the aqueous mixture a borate crosslinker for reversible crosslinking at a temperature below 40° C., preferably to provide continuous viscosification during the injection step. The method can also include introducing a clay stabilizer and a surfactant into the aqueous mixture. In one embodiment, the polymer can be ionically modified to introduce a cationic or anionic moiety and the surfactant can comprise an oppositely charged moiety. In one specific embodiment, tetramethyl ammonium chloride and a surfactant are introduced into the aqueous mixture.

Another embodiment provides a method of treating a subterranean formation comprising: (a) mixing a crosslinkable, hydratable polymer and a crosslinking agent in an aqueous medium in amounts effective to form a gel having a rheology profile comprising: reversible shear viscosity recovery at a first condition comprising a temperature below 40° C.; and a shear-sensitive persistent viscosity at a second condition comprising an elevated temperature with respect to the first condition; wherein the crosslinking agent comprises: (1) a borate source and (2) a complex of a Group 4 metal and a first ligand selected from the group consisting of amino acids and phosphono acids, and salts and derivatives thereof, (b) gelling the aqueous mixture at the first condition temperature; and (c) injecting the aqueous mixture into a fracture in the subterranean formation, wherein the subterranean formation has a temperature meeting the second condition.

In one embodiment of the dual crosslinker method, the first condition can comprise a crosslinking onset temperature above 10° C. and below 40° C., and a pH from 8.5 to 12.5, and wherein the second condition can comprise a crosslinking onset temperature from 40° C. to 60° C. and a pH resulting from heating the aqueous mixture from the first condition. In a preferred embodiment, the method can include continuously maintaining viscosity of the mixture from the first condition to the second condition without viscosity loss. The first condition can occur in the wellbore during the injection, and the second condition can occur near exit from the wellbore.

In some embodiments well treatment fluids are provided. The treatment fluids can include, in an aqueous mixture or non-aqueous mixture, a crosslinkable, hydratable polymer and a delayed crosslinking agent, in amounts effective to obtain an aqueous mixture that can form a persistent gel at a crosslinking condition comprising a temperature of at least 40° C. and a pH sensitivity slope (pHSS) of 30° C. per pH unit or less for at least one pH unit range within a pH range from 9.5 to 11.5. The crosslinking agent in an embodiment comprises a complex of a Group 4 metal and a first ligand selected from the group consisting of amino carboxylic acid and phosphono carboxylic acids, and salts and derivatives thereof.

In an embodiment, the persistent crosslinking condition can include a temperature less than 60° C. and a pH between 10 and 10.5. The pHSS is preferably from 5° C. to 25° C. per pH unit. In one embodiment the aqueous mixture further comprises a pH adjusting compound to control a crosslinking temperature.

In an embodiment, the first ligand in the treatment fluid has from 2 to 40 carbon atoms and comprises an α-amino acid, an α-amino derivative or an α-amino acid salt of the formula above. In an embodiment of the α-amino acid, there is the proviso that when both $R_1$ and $R_2$ are hydrogen, $R_7$ and $R_8$ are selected from hydrogen and substituted or unsubstituted aliphatic hydrocarbyl other than hydroxyalkyl. In an alternate embodiment, $R_1$, $R_2$, $R_7$ and $R_8$ are selected from hydrogen and substituted or unsubstituted aliphatic hydrocarbyl other than hydroxyalkyl. Alternatively or additionally, $R_7$ and $R_8$ can both be hydrogen. In a further alternative or additional embodiment, at least one of $R_1$ and $R_2$ is carboxyalkyl, e.g. an alpha amino dicarboxylic or tricarboxylic acid. Preferably, the first ligand is derived from aspartic acid, glutamic acid or a combination thereof.

In another embodiment in the well treatment fluid, the first ligand has from 3 to 40 carbon atoms and comprises a β-amino acid, a β-amino acid derivative or a β-amino acid salt of the formula above. In another embodiment, the first ligand is derived from beta-alanine.

In an additional embodiment in the well treatment fluid, the first ligand has 2 to 40 carbon atoms and comprises a phosphono carboxylic acid, a phosphono carboxylic acid derivative or a phosphono carboxylic acid salt of the formula above. In another embodiment, the first ligand is derived from phosphonoacetic acid.

In an embodiment of the well treatment fluid, the Group 4 metal is titanium or zirconium. The Group 4 metal can present in a concentration between 10 and 500 ppm by weight of the liquid phase of the aqueous mixture. Further, the complex can have a molar ratio of the metal to the first ligand from 1:1 to about 1:6. The complex can also have a second ligand selected from: alkanolamine (such as diethanolamine, triethanolamine), alkoxide, and α-hydroxyacid derivatives, wherein a molar ratio of the metal to the second ligand is from 1:1 to about 1:10.

The crosslinkable polymer in an embodiment of the well treatment fluid can be selected from the group consisting of polysaccharides, such as for example, ionically modified galactomannan, cellulose, starch and the like.

In an embodiment, the well treatment fluid can also include proppant, e.g. in a fracturing treatment fluid. In various embodiments, the well treatment fluid can also include a thermal stabilizer, a clay stabilizer, a surfactant, or a combination thereof into the aqueous mixture.

In an embodiment, the well treatment fluid can further comprise a borate crosslinker for reversible crosslinking at a temperature below 40° C., which can be used to provide continuous viscosification during injection. The well treatment fluid can also include a clay stabilizer and a surfactant. In one embodiment, the polymer can be ionically modified to introduce cationic or anionic moieties and the surfactant can comprise an oppositely charged moieties. In one specific embodiment, the well treatment fluid comprises tetramethyl ammonium chloride and a surfactant. The polymer in an embodiment is ionically modified with ionic or anionic moieties, and the surfactant can include oppositely charged moieties.

Another embodiment provides a well treatment fluid comprising an aqueous mixture of a crosslinkable, hydratable polymer and a crosslinking agent in amounts effective for forming a gel having a rheology profile comprising: reversible shear viscosity recovery at a first condition comprising a temperature below 40° C.; and a shear-sensitive persistent viscosity at a second condition comprising an elevated temperature with respect to the first condition. In an embodiment, the crosslinking agent comprises: (1) a borate source and (2) a complex of a Group 4 metal and a first ligand selected from the group consisting of amino carboxylic acids and phosphono carboxylic acids, and salts and derivatives thereof.

In one embodiment, the first condition can comprise a temperature above 10° C. and below 40° C., and a pH from 8.5 to 12.5, and wherein the second condition can comprise a crosslinking onset temperature from 40° C. to 60° C. and a pH resulting from heating the aqueous mixture from the first condition. Further, the well treatment fluid can include a pH adjusting compound to buffer the pH of the aqueous mixture at the first condition.

In some embodiments, the rheology profile can include continuous maintenance of the viscosity of the mixture from the first condition to the second condition without significant viscosity loss other than from reversible shear losses. As used herein, significant viscosity loss is defined as one-half of the maximum viscosity of the rheology profile, preferably any viscosity loss is less than one-third the maximum viscosity. In the laboratory, an aqueous mixture can be tested for viscosity losses by running the mixture in a heated rheometer at a shear rate of 100/sec. In use of the well treatment fluid, the first condition can occur in the wellbore during the injection, and the second condition can occur near exit from the wellbore.

DETAILED DESCRIPTION

Figure 1:
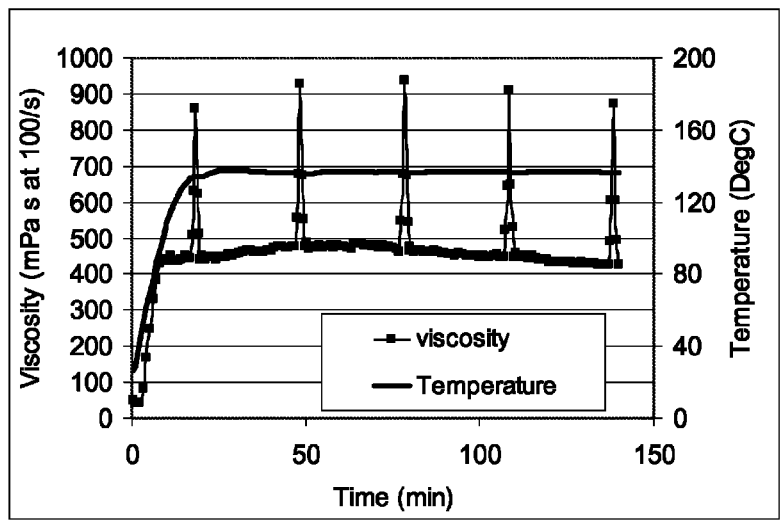
FIG. 1 shows the rheology profile of a fluid crosslinked with 2 ml/L zirconium-glutamic acid crosslinker solution according to the embodiment described in Example 4.

At the outset, it should be noted that in the development of any such actual embodiment, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

Some aspects are directed to methods of treating subterranean formations using an aqueous mixture of a polymer that is crosslinked with a metal-ligand complex. The hydratable polymer is generally stable in the presence of dissolved salts. Accordingly, ordinary tap water, produced water, brines, and the like can be used to prepare the polymer solution used in an embodiment of the aqueous mixture.

In embodiments where the aqueous medium is a brine, the brine is water comprising an inorganic salt or organic salt. Some useful inorganic salts include, but are not limited to, alkali metal halides, such as potassium chloride. The carrier brine phase may also comprise an organic salt, preferably sodium or potassium formate. Some inorganic divalent salts include calcium halides, such as calcium chloride or calcium bromide. Sodium bromide, potassium bromide, or cesium bromide may also be used. The salt is chosen for compatibility reasons i.e. where the reservoir drilling fluid used a particular brine phase and the completion/clean up fluid brine phase is chosen to have the same brine phase. Some salts can also function as stabilizers, e.g. clay stabilizers such as KCl or TMAC, and/or charge screening of ionic polymers.

The hydratable polymer in an embodiment is a high molecular weight water-soluble polysaccharide containing cis-hydroxyl and/or carboxylate groups that can form a complex with the released metal. Without limitation, useful polysaccharides have molecular weights in the range of about 200,000 to about 3,000,000. Galactomannans represent an embodiment of polysaccharides having adjacent cis-hydroxyl groups for the purposes herein. The term galactomannans refers in various aspects to natural occurring polysaccharides derived from various endosperms of seeds. They are primarily composed of D-mannose and D-galactose units. They generally have similar physical properties, such as being soluble in water to form thick highly viscous solutions which usually can be gelled (crosslinked) by the addition of such inorganic salts as borax. Examples of some plants producing seeds containing galactomannan gums include tara, huisache, locust bean, palo verde, flame tree, guar bean plant, honey locust, lucerne, Kentucky coffee bean, Japanese pagoda tree, indigo, jenna, rattlehox, clover, fenergruk seeds, soy bean hulls and the like. The gum is provided in a convenient particulate form. Of these polysaccharides, guar and its derivatives are preferred. These include guar gum, carboxymethyl guar, hydroxyethyl guar, carboxymethylhydroxyethyl guar, hydroxypropyl guar (HPG), carboxymethylhydroxypropyl guar (CMHPG), guar hydroxyalkyltriammonium chloride, and combinations thereof. As a galactomannan, guar gum is a branched copolymer containing a mannose backbone with galactose branches.

Heteropolysaccharides, such as diutan, xanthan, diutan mixture with any other polymers, and scleroglucan may be used as the hydratable polymer. Synthetic polymers such as, but not limited to, polyacrylamide and polyacrylate polymers and copolymers are used typically for high-temperature applications. Nonlimiting examples of suitable viscoelastic surfactants useful for viscosifying some fluids include cationic surfactants, anionic surfactants, zwitterionic surfactants, amphoteric surfactants, nonionic surfactants, and combinations thereof.

The hydratable polymer may be present at any suitable concentration. In various embodiments hereof, the hydratable polymer can be present in an amount of from about 1.2 to less than about 7.2 g/L (10 to 60 pounds per thousand gallons or ppt) of liquid phase, or from about 15 to less than about 40 pounds per thousand gallons, from about 1.8 g/L (15 ppt) to about 4.2 g/L (35 ppt), 1.8 g/L (15 ppt) to about 3 g/L (25 ppt), or even from about 2 g/L (17 ppt) to about 2.6 g/L (22 ppt). Generally, the hydratable polymer can be present in an amount of from about 1.2 g/L (10 ppt) to less than about 6 g/L (50 ppt) of liquid phase, with a lower limit of polymer being no less than about 1.2, 1.32, 1.44, 1.56, 1.68, 1.8, 1.92, 2.04, 2.16 or 2.18 g/L (10, 11, 12, 13, 14, 15, 16, 17, 18, or 19 ppt) of the liquid phase, and the upper limit being less than about 7.2 g/L (60 ppt), no greater than 7.07, 6.47, 5.87, 5.27, 4.67, 4.07, 3.6, 3.47, 3.36, 3.24, 3.12, 3, 2.88, 2.76, 2.64, 2.52, or 2.4 g/L (59, 54, 49, 44, 39, 34, 30, 29, 28, 27, 26, 25, 24, 23, 22, 21, or 20 ppt) of the liquid phase. In some embodiments, the polymers can be present in an amount of about 2.4 g/L (20 ppt).

Fluids incorporating a hydratable polymer may have any suitable viscosity, preferably a viscosity value of about 50 mPa-s or greater at a shear rate of about 100 s$^{-1}$ at treatment temperature, more preferably about 75 mPa-s or greater at a shear rate of about 100 s$^{-1}$, and even more preferably about 100 mPa-s or greater, in some instances. At the concentrations mentioned, the hydration rate is independent of guar concentration. Use of lower levels tends to lead to development of insufficient viscosity, while higher concentrations tend to waste material. Where those disadvantages are avoided, higher and lower concentrations are useful.

The term "persistent gel" is used herein in reference to polymers that are crosslinked via a generally irreversible crosslinking mechanism such as, for example, metal crosslinking. Persistent gels are sensitive to high shear and can lose viscosity or "break" when high shear (or a chemical and/or thermal reaction) breaks the polymer backbone which is irreversibly bound to the metal crosslinkers.

As used herein, a hydrocarbyl is a monovalent radical consisting of hydrogen and carbon atoms, e.g., branched, linear or cyclic aliphatic, saturated or unsaturated, or aromatic; and a heterohydrocarbyl is a monovalent radical consisting of atoms of hydrogen, carbon and one or more of oxygen, nitrogen, sulfur or the like. Hydrocarbylene and heterohydrocarbylene are the corresponding divalent radicals.

As used herein, the term "aliphatic hydrocarbon structure" is any organic structure containing exclusively hydrogen and carbon atoms except those containing aromatic structures. Examples of aliphatic structures are methyl, isopropyl, isobutyl, and the like. Similarly, "heteroatom containing hydrocarbon structure" is any organic structure containing in addition to carbon and hydrogen at least another atom selected from oxygen, nitrogen, sulfur, except those containing aromatic structures. Examples of such structures are hydroxymethyl, hydroxyethyl, hydroxypropyl, carboxymethyl, aminobutyl, thiomethyl, and the like.

When a polymer is referred to as comprising a monomer or comonomer, the monomer is present in the polymer in the polymerized form of the monomer or in the derivative from the monomer. However, for ease of reference the phrase comprising the (respective) monomer or the like may be used as shorthand.

Likewise, when ligands are described as comprising neutral stable forms or ionic forms of the compounds, it is well understood by one skilled in the art, that the ionic form or other derivatized form of the component is the form that reacts with the metals to produce the complex wherein the ligand is present in the complexed derivative form. When crosslinkers are used in wellbore treatment fluids for subterranean applications, in one embodiment, a water soluble polymer is placed into and hydrated in a mixer with water, which can contain other ingredients such as surfactants, salts, buffers, and temperature stabilizers. A concentrated crosslinker solution, comprising from 1000 ppm of the metal-ligand complex up to saturation, is added prior to the fluid mixture being pumped into the well to provide the desired concentration of the metal in the injected fluid mixture. Applications such as hydraulic fracturing, gravel packing and conformance control use such crosslinked fluid systems. The liquid crosslinker additive concentrations typically range from about 0.01 volume percent to 1.0 percent by volume, based upon total volume of the liquid phase.

It was established that certain nitrogen- and/or phosphorus-containing carboxylic acids and derivatives can form complexes with the metals based crosslinkers. The metal in various embodiments can be a Group 4 metal, such as Zr and Ti. Zirconium (IV) was found to be preferred metal to form complexes with various alpha or beta amino acids, phosphonic acids and derivatives thereof for the application in crosslinker formulations. These compounds are selected in one embodiment from various alpha or beta amino carboxylic acids, phosphono carboxylic acids, salts and derivatives thereof of the following general structures:

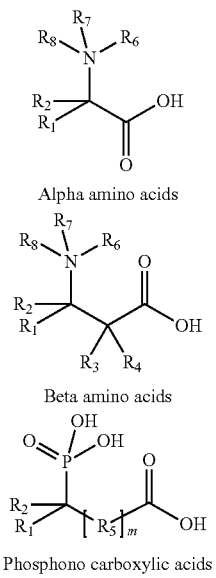

Alpha amino acids

Beta amino acids

Phosphono carboxylic acids wherein in one embodiment, $R_1$, $R_2$, $R_3$, $R_4$, $R_7$ and $R_5$ can be any substituent such as hydrogen, hydrocarbyl or heterohydrocarbyl; $R_6$ is hydrogen or a lone electron pair; m is 0 or 1, and when m is 1, $R_5$ is hydrocarbylene or heterohydrocarbylene. Also, any two of $R_1$, $R_2$, $R_3$, $R_4$, $R_7$ and $R_8$ in one of the compounds can together form a cyclic hydrocarbylene or heterohydrocabylene bridge.

In various embodiments, each of the hydrocarbyl, heterohydrocarbyl, hydrocarbylene and/or heterohydrocarbylene radicals can comprise from 1 to 12 carbon atoms, from 1 to 8 carbon atoms, from 1 to 6 carbon atoms, from 1 to 4 carbon atoms, or from 1 to 3 carbon atoms. The compound can have a total of from 2 to 40 carbon atoms, from 3 to 40 carbon atoms, from 3 to 24 carbon atoms, from 3 to 18 carbon atoms, from 3 to 12 carbon atoms, or from 3 to 8 carbon atoms.

In one embodiment, at least one of $R_1$, $R_2$, $R_3$, $R_4$, $R_5$, $R_7$ and $R_8$ is a heterohydrocarbyl ($R_1$, $R_2$, $R_3$, $R_4$, $R_7$, $R_8$) or heterohydrocarbylene ($R_5$), substituted with one or more functional groups, preferably an electrophilic functional group that can attach the compound to the Group 4 metal together with the carboxylic acid and/or phosphonic acid group as a multidentate ligand, e.g. bidentate, tridentate etc. In an embodiment, the functional group substituent(s) can be selected from carboxylic acids; carboxy salts; carboxy esters, amides and imides; hydroxy; alkoxide; phenoxide; thiolate; thioether; xanthate; cyanide; nitrile; amino and mixtures thereof. In another embodiment, the functional group substituent(s) can be selected from carboxylic acids; carboxy salts; carboxy esters; amides and imides; and mixtures thereof.

In one embodiment the compound is a primary alpha-amino acid of the above formula wherein $R_7$ and $R_8$ are hydrogen, as in many of the standard amino acids. In alternative or additional embodiments, $R_6$ is hydrogen (forming an ammonium ion) or a lone electron pair, and $R_1$, $R_2$, $R_7$ and $R_8$ are independently selected from hydrogen (e.g. glycine), alkyl (e.g. alanine, leucine, isoleucine, valine), phenylalkyl (e.g. phenylalanine), hydroxyalkyl (e.g. serine, threonine), hydroxyphenylalkyl (e.g. tyrosine), carboxyalkyl (e.g., aspartic acid, glutamic acid), carbamoylalkyl (e.g. asparagine, glutamine), carbamoylaminoalkyl (e.g. citrulline), aminoalkyl (e.g. lysine, ornithine), indolylalkyl (e.g. tryptophan), imidazolylalkyl (e.g. histidine), guanidinylalkyl or diaminomethylidene-aminoalkyl (arginine), sulfanylalkyl (e.g. cysteine, homocysteine), alkylsulfanylalkyl (e.g. methionine), and the like. Further, $R_1$ and $R_2$ together, $R_7$ and $R_8$ together, or one of $R_1$ and $R_2$ and one of $R_7$ and $R_8$ together, can form a hydrocarbylene or heterohydrocarbylene bridge or cyclic structure, such as for example, pyrrolidine in proline or hydroxypyrrolidine in hydroxyproline. Of these, a preferred embodiment is wherein one or more of $R_1$, $R_2$, $R_7$ and $R_8$ are carboxyalkyl, dicarboxyalkyl or tricarboxyalkyl of from 2 to 8, 2 to 6, or 2 to 4 carbon atoms. In a further embodiment, neither $R_7$ nor $R_8$ are hydroxyalkyl. Alternatively, none of $R_1$, $R_2$, $R_7$ and $R_8$ is hydroxyalkyl.

In one embodiment the compound is a beta-amino acid of the above formula wherein $R_1$, $R_2$, $R_3$, $R_4$, $R_7$ and $R_8$ are independently selected from hydrogen and hydrocarbyl optionally containing a heteroatom, or together can form a substituted or unsubstituted cycloaliphatic bridge optionally containing a heteroatom, and $R_6$ is hydrogen (forming an ammonium ion) or a lone electron pair. In one embodiment the compound is a primary beta-amino acid of the above formula wherein $R_7$ and $R_8$ are hydrogen. In an alternative or additional embodiment, $R_1$, $R_2$, $R_3$, $R_4$, $R_7$ and $R_8$ are independently selected from hydrogen, alkyl, phenylalkyl, hydroxyalkyl, hydroxyphenylalkyl, carboxyalkyl, carbamoylalkyl, carbamoylaminoalkyl, aminoalkyl, indolylalkyl, imidazolylalkyl, guanidinylalkyl or diaminomethylidene-aminoalkyl, sulfanylalkyl, alkylsulfanylalkyl, and the like. Further, $R_1$ and $R_2$ together, $R_3$ and $R_4$ together, $R_7$ and $R_8$ together, or one of $R_1$ and $R_2$ and one of $R_7$ and $R_8$ together, can form a hydrocarbylene or heterohydrocarbylene bridge or cyclic structure, such as for example, pyrrolidine or hydroxypyrrolidine. In a further embodiment, neither $R_7$ nor $R_8$ are hydroxyalkyl. Alternatively, none of $R_1$, $R_2$, $R_3$, $R_4$, $R_7$ and $R_8$ is hydroxyalkyl. In another embodiment, the compound is derived from beta-alanine.

In an additional embodiment, the compound is a phosphonic acid according to the formula above wherein $R_1$ and $R_2$ are independently selected from hydrogen and hydrocarbyl optionally containing a heteroatom, or together can form a substituted or unsubstituted cycloaliphatic bridge optionally containing a heteroatom; m is 0 or 1, and when m is 1, $R_5$ is hydrocarbylene or heterohydrocarbylene. In an alternative or additional embodiment, $R_1$ and $R_2$ are independently selected from hydrogen, alkyl, phenyl, phenylalkyl, hydroxy, hydroxyalkyl, hydroxyphenylalkyl, carboxy, carboxyalkyl, carbamoyl, carbamoylalkyl, carbamoylaminoalkyl, amino, aminoalkyl, indolyl, indolylalkyl, imidazolyl, imidazolylalkyl, guanidinyl, guanidinylalkyl or diaminomethylidene-aminoalkyl, sulfanyl, sulfanylalkyl, alkylsulfanylalkyl, and the like. In one embodiment, the compound is phosphonoacetic acid.

The molar ratio of metal to ligand in the complex can range from 1:1 to 1:10. Preferably the ratio of metal to ligand can range from 1:1 to 1:6. More preferably the ratio of metal to ligand can range from 1:1 to 1:4. Those complexes, including mixtures thereof, can be used to crosslink the hydratable polymers. For a given polymer the crosslinking by metal-amino acid or metal-phosphonic acid complex occurs at substantially higher temperatures than by metal complexes formed only with ligands such as alkanolamines, like triethanolamine, or alpha hydroxy carboxylates, like lactate, that have been used as delay agents.

The following acids and their corresponding addition salts are representative examples of ligands that can be used for high-temperature crosslinker formulations: alanine, arginine, asparagine, aspartic acid, cysteine, glutamic acid, glutamine, glycine, histidine, isoleucine, leucine, lysine, methionine, phenylalanine, proline, tryptophan, tyrosine, valine, carnitine, ornithine, taurine, citrulline, glutathione, hydroxyproline, and the like. The following acids and their salts were found to be more preferred ligands for high-temperature crosslinker formulations: D,L-glutamic acid, L-glutamic acid, D-glutamic acid, D,L-aspartic acid, D-aspartic acid, L-aspartic acid, beta-alanine, D,L-alanine, D-alanine, L-alanine, and phosphonoacetic acid.

In an embodiment, the ligand system is selected to provide a pHSS less than 30° C., preferably from 2° to 25° C., and/or a crosslinking onset temperature above 40° C., preferably between 40° C. and 60° C. As used herein, "pH sensitivity slope" has units ° C. per unit pH and refers to the change in crosslinking temperature in relation to the change in pH for a system of polymer and metal-ligand crosslinker, and is calculated according to the formula: $\text{pHSS}=|(T_{XL1}-T_{XL2})/(pH_2-pH_1)|$ where $pH_1$ and $pH_2$ are lower and higher pH values, respectively, at 25° C. within the pH range 8.5-12.5, preferably 9-12, preferably 9.5-11.5, more preferably 10 to 11, and especially 10-10.5, for the system being evaluated prior to heating, without borate or other low temperature crosslinker, to determine the corresponding crosslinking temperatures, $T_{XL1}$ and $T_{XL2}$, according to the microwave crosslinking temperature test described herein. In general, the crosslinking temperature increases as the pH decreases, but this is not a requirement of the invention and the absolute value of the pHSS is taken where pHSS is not zero and the crosslinking temperature decreases as the pH increases. Preferably, the pHSS is determined where the average of $pH_1$ and $pH_2$ at which the crosslinking temperatures are determined is between 10 and 11, and wherein $0.5 \leq (pH_2-pH_1) \leq 1.0$. Preferably, the pH sensitivity slope is 30° C. per pH unit or less for one unit pH within the pH range from 9.5 to 11.5, i.e. there exists a pH range of 1 unit (e.g. from 10.0 to 11.0) where the crosslinking temperature does not vary by more than 30° C. per pH unit. For the metal-ligand crosslinker systems the persistent gel crosslinking temperature in one embodiment is at least 40° C., and preferably less than 60° C. in another embodiment.

A buffering agent may be employed to buffer the fracturing fluid, i.e., moderate amounts of either a strong base or acid may be added without causing any large change in pH value of the fracturing fluid. In various embodiments, the buffering agent is a combination of: a weak acid and a salt of the weak acid; an acid salt with a normal salt; or two acid salts. Examples of suitable buffering agents are: $NaH_2PO_4$—$Na_2HPO_4$; sodium carbonate-sodium bicarbonate; sodium bicarbonate; and the like. By employing a buffering agent in addition to a hydroxyl ion producing material, a fracturing fluid is provided which is more stable to a wide range of pH values found in local water supplies and to the influence of acidic materials located in formations and the like. In an exemplary embodiment, the pH control agent is varied between about 0.6 percent and about 40 percent by weight of the polysaccharide employed.

Non-limiting examples of hydroxyl ion releasing agent include any soluble or partially soluble hydroxide or carbonate that provides the desirable pH value in the fracturing fluid to promote borate ion formation and crosslinking with the polysaccharide and polyol. The alkali metal hydroxides, e.g., sodium hydroxide, and carbonates are preferred. Other acceptable materials are calcium hydroxide, magnesium hydroxide, bismuth hydroxide, lead hydroxide, nickel hydroxide, barium hydroxide, strontium hydroxide, and the like. At temperatures above about 79° C. (175° F.), potassium fluoride (KF) can be used to prevent the precipitation of MgO (magnesium oxide) when magnesium hydroxide is used as a hydroxyl ion releasing agent. The amount of the hydroxyl ion releasing agent used in an embodiment is sufficient to yield a pH value in the fracturing fluid of at least about 8.0, preferably at least 8.5, preferably at least about 9.5, and more preferably between about 9.5 and about 12.

Aqueous fluid embodiments may also comprise an organoamino compound. Examples of suitable organoamino compounds include, but are not necessarily limited to, tetraethylenepentamine (TEPA), triethylenetetramine, pentaethylenhexamine, triethanolamine (TEA), and the like, or any mixtures thereof. A particularly useful organoamino compound is TEPA. Organoamines may be used to adjust (increase) pH, for example. When organoamino compounds are used in fluids, they are incorporated at an amount from about 0.01 weight percent to about 2.0 weight percent based on total liquid phase weight. Preferably, when used, the organoamino compound is incorporated at an amount from about 0.05 weight percent to about 1.0 weight percent based on total liquid phase weight.

A borate source can be used as a co-crosslinker, especially where low temperature, reversible crosslinking is used in the method for generally continuous viscosification before the polymer is crosslinked with the metal-ligand complex, or simultaneously. The aqueous mixture can thus include a borate source, which can either be included as a soluble borate or borate precursor such as boric acid, or it can be provided as a slurry of borate source solids for delayed borate crosslinking until the fluid is near exit from the tubular into the downhole formation. By definition, "slurry" is a mixture of suspended solids and liquids. The slurry that is used in at least some embodiments can be prepared at or near the site of the well bore or can be prepared a remote location and shipped to the site of its intended use. Methods of preparing slurries are known in the art. It is preferred that the slurry be prepared offsite, since this can reduce the expense associated with the transport of equipment, materials and expertise necessary to the preparation of a slurry on site.

The term "mesh" as used herein means the Tyler mesh size. The Tyler mesh size is a scale of particle size in powders. The particle size can be categorized by sieving or screening, that is, by running the sample through a specific sized screen. The particles can be separated into two or more size fractions by stacking the screens, thereby determining the particle size distribution.

Solid borate crosslinking agents suitable in certain embodiments are water-reactive and insoluble in a non-aqueous slurry, but become soluble when the slurry is mixed with the aqueous medium. In certain embodiments, the solids will include a slowly soluble boron-containing mineral. These may include borates, such as anhydrous borax and borate hydrate, e.g. sodium tetraborate.

The term "non-aqueous", as used herein, in one sense refers to a composition to which no water has been added as such, and in another sense refers to a composition the liquid phase of which comprises no more than about 1, 0.5, 0.1 or about 0.01 weight percent water based on the weight of the liquid phase. The liquid phase of the borate slurry in embodiments can be a hydrocarbon or oil such as naphtha, kerosene or diesel, or a non-oily liquid. In the case of hydrophobic liquids such as hydrocarbons, the solubilization of the borate solids is delayed because the water must penetrate the hydrophobic coating on the solids.

In one embodiment, the liquid phase of the borate slurry can include a hygroscopic liquid which is generally non-aqueous and non-oily. The liquid can have strong affinity for water to keep the water away from any crosslinking agent, which would otherwise reduce the desired delay of crosslinking, i.e. accelerate the gelation. Glycols, including glycol-ethers, and especially including glycol-partial-ethers, represent one class of hygroscopic liquids. Specific representative examples of ethylene and propylene glycols include ethylene glycol, diethylene glycol, triethylene glycol, propylene glycol, dipropylene glycol, tripropylene glycol, $C_1$ to $C_8$ monoalkyl ethers thereof, and the like. Additional examples include 1,3-propanediol, 1,4-butanediol, 1,4-butenediol, thiodiglycol, 2-methyl-1,3-propanediol, pentane-1,2-diol, pentane-1,3-diol, pentane-1,4-diol, pentane-1,5-diol, pentane-2,3-diol, pentane-2,4-diol, hexane-1,2-diol, heptane-1,2-diol, 2-methylpentane-2,4-diol, 2-ethylhexane-1,3-diol, $C_1$ to $C_8$ monoalkyl ethers thereof, and the like.

In one embodiment, the hygroscopic liquid can include glycol ethers with the molecular formula R—$OCH_2CHR^1OH$, where R is substituted or unsubstituted hydrocarbyl of about 1 to 8 carbon atoms and $R^1$ is hydrogen or alkyl of about 1 to 3 carbon atoms. Specific representative examples include solvents based on alkyl ethers of ethylene and propylene glycol, commercially available under the trade designation CELLOSOLVE, DOWANOL, and the like. Note that it is conventional in the industry to refer to and use such alkoxyethanols as solvents, but herein the slurried borate solids should not be soluble in the liquid(s) used in the borate slurry.

The liquid phase of the borate slurry can have a low viscosity that facilitates mixing and pumping, e.g. less than 50 cP (50 mPa-s), less than 35 cP (35 mPa-s), or less than 10 cP (10 mPa-s) in different embodiments. The slurry liquid can in one embodiment contain a sufficient proportion of the glycol to maintain hygroscopic characteristics depending on the humidity and temperature of the ambient air to which it may be exposed, i.e. the hygroscopic liquid can contain glycol in a proportion at or preferably exceeding the relative humectant value thereof. As used herein, the relative humectant value is the equilibrium concentration in percent by weight of the glycol in aqueous solution in contact with air at ambient temperature and humidity, e.g. 97.2 weight percent propylene glycol for air at 48.9° C. (120° F.) and 10% relative humidity, or 40 weight percent propylene glycol for air at 4.4° C. (40° F.) and 90% relative humidity. In other embodiments, the hygroscopic liquid can comprise at least 50 percent by weight in the slurry liquid phase (excluding any insoluble or suspended solids) of the glycol, at least 80 percent by weight, at least 90 percent by weight, at least 95 percent by weight, or at least 98 percent by weight.

If desired, in one embodiment, the borate slurry can also include a suspension aid to help distance the suspended solids from each other, thereby inhibiting the solids from clumping and falling out of the suspension. The suspension aid can include silica, organophilic clay, polymeric suspending agents, other thixotropic agents or a combination thereof. In certain embodiments the suspension aid can include polyacrylic acid, an ether cellulosic derivative, polyvinyl alcohol, carboxymethylethylcellulose, polyvinyl acetate, thiourea crystals or a combination thereof. As a crosslinked acrylic acid based polymer that can be used as a suspension aid, there may be mentioned the liquid or powdered polymers available commercially under the trade designation CARBOPOL. As an ether cellulosic derivative, there may be mentioned hydroxypropyl cellulose. Suitable organophilic clays include kaolinite, halloysite, vermiculite, chlorite, attapullgite, smectite, montmorillonite, bentonite, hectorite or a combination thereof.

In various embodiments, the borate slurry component can include crosslinking delay agents such as a polyol compound, including sorbitol, mannitol, sodium gluconate and combinations thereof. The crosslink delay agent can provide performance improvement in the system through increased crosslink delay, enhanced gel strength when the polymer is less than fully hydrated, and enhanced rate of shear recovery. It is preferred that the polyol be present in an amount effective for improved shear recovery. Further, the polyol can be present in an amount that is not effective as a breaker or breaker aid.

In some embodiments, ionic polymers (such as CMHPG) in an aqueous solution can be present in solvated coils that have a larger radius of gyration than the corresponding nonionic parent polymer due to electric repulsions between like charges from the ionic substituents. This may cause the polymer to spread out without sufficient overlapping of the functional groups from different polymer chains for a crosslinker to react with more than one functional group (no crosslinking), or alternatively, it may cause the orientation of functional groups to exist in an orientation that is difficult for the crosslinker to reach. For example, in deionized water, guar polymer can be crosslinked easily by boron crosslinker while CMHPG can not. Screening the charges of the ionic species can reduce or eliminate the electric repulsion and thus collapse the polymer coil to create some overlapping, which in turn can allow the crosslinker to crosslink the ionic polymers.

Different compounds to screen the charges of an ionic polymer (for example CMHPG), namely KCl (or other salt to increase ionic strength) to screen, or ionic surfactants to screen, such as quaternary ammonium salt for CMHPG, may be used. Salts can be selected from a group of different common salts including organic or inorganic such as KCl, NaCl, NaBr, $CaCl_2$, $R_4N^+Cl^-$ (e.g. TMAC), NaOAc etc. Surfactants can be fatty acid quaternary amine chloride (bromide, iodide), with at least one alkyl group being long chain fatty acid or alpha olefin derivatives, other substituents can be methyl, ethyl, iso-propyl type of alkyls, ethoxylated alkyl, aromatic alkyls etc. Some methods may also use cationic polymers.

Although not limited to any particular theory of operation or mechanism, it is conceptualized that fluid performance may be further optimized when polymer coils in solution and have enough overlapping so that crosslinking occurs both intra- and inter-molecularly. Viscoelasticity improvements may come from inter-molecular crosslink, and intra-molecular crosslink can not be effectively avoided. For example, adding KCl or tetramethylammonium chloride (TMAC) to an anionic polymer solution such as CMHPG can effectively screen the anionic charges with electric bi-layers to decrease the charge intensity, and in turn decrease the repulsions between charged polymer chains. Charge screening in this manner can collapse the polymer chains and achieve overlapping for crosslinking to occur.

Some fluids according to some embodiments may also include a surfactant. In one embodiment, for example, the aqueous mixture comprises both a stabilizer such as KCl or especially TMAC, as well as a charge screening surfactant. This system can be particularly effective in ligand-metal crosslinker methods that also employ borate as a low temperature co-crosslinker. Alternatively or additionally, any surfactant which aids the dispersion and/or stabilization of a gas component in the base fluid to form an energized fluid can be used. Viscoelastic surfactants, such as those described in U.S. Pat. No. 6,703,352, U.S. Pat. No. 6,239,183, U.S. Pat. No. 6,506,710, U.S. Pat. No. 7,303,018 and U.S. Pat. No. 6,482,866, all incorporated herein by reference, are also suitable for use in fluids in some embodiments. Examples of suitable surfactants also include, but are not limited to, amphoteric surfactants or zwitterionic surfactants. Alkyl betaines, alkyl amido betaines, alkyl imidazolines, alkyl amine oxides and alkyl quaternary ammonium carboxylates are some examples of zwitterionic surfactants. An example of a useful surfactant is the amphoteric alkyl amine contained in the surfactant solution AQUAT 944® (available from Baker Petrolite of Sugar Land, Tex.).

Charge screening surfactants may be employed, as previously mentioned. In some embodiments, the anionic surfactants such as alkyl carboxylates, alkyl ether carboxylates, alkyl sulfates, alkyl ether sulfates, alkyl sulfonates, α-olefin sulfonates, alkyl ether sulfates, alkyl phosphates and alkyl ether phosphates may be used. Anionic surfactants typically have a negatively charged moiety and a hydrophobic or aliphatic tail, and can be used to charge screen cationic polymers. Examples of suitable ionic surfactants also include, but are not limited to, cationic surfactants such as alkyl amines, alkyl diamines, alkyl ether amines, alkyl quaternary ammonium, dialkyl quaternary ammonium and ester quaternary ammonium compounds. Cationic surfactants typically have a positively charged moiety and a hydrophobic or aliphatic tail, and can be used to charge screen anionic polymers such as CMHPG.

In other embodiments, the surfactant is a blend of two or more of the surfactants described above, or a blend of any of the surfactant or surfactants described above with one or more nonionic surfactants. Examples of suitable nonionic surfactants include, but are not limited to, alkyl alcohol ethoxylates, alkyl phenol ethoxylates, alkyl acid ethoxylates, alkyl amine ethoxylates, sorbitan alkanoates and ethoxylated sorbitan alkanoates. Any effective amount of surfactant or blend of surfactants may be used in aqueous energized fluids. Preferably the fluids incorporate the surfactant or blend of surfactants in an amount of about 0.02 weight percent to about 5 weight percent of total liquid phase weight, and more preferably from about 0.05 weight percent to about 2 weight percent of total liquid phase weight. One particularly useful surfactant is sodium tridecyl ether sulfate.

Friction reducers may also be incorporated in any fluid embodiment. Any suitable friction reducer polymer, such as polyacrylamide and copolymers, partially hydrolyzed polyacrylamide, poly(2-acrylamido-2-methyl-1-propane sulfonic acid) (polyAMPS), and polyethylene oxide may be used. Commercial drag reducing chemicals such as those sold by Conoco Inc. under the trademark "CDR" as described in U.S. Pat. No. 3,692,676 or drag reducers such as those sold by Chemlink designated under the trademarks FLO1003, FLO1004, FLO1005 and FLO1008 have also been found to be effective. These polymeric species added as friction reducers or viscosity index improvers may also act as excellent fluid loss additives reducing or even eliminating the need for conventional fluid loss additives. Latex resins or polymer emulsions may be incorporated as fluid loss additives. Shear recovery agents may also be used in embodiments.

Fluids may also comprise a breaker. The purpose of this component is to "break" or diminish the viscosity of the fluid so that this fluid is more easily recovered from the formation during cleanup. With regard to breaking down viscosity, oxidizers, enzymes, or acids may be used. Breakers reduce the polymer's molecular weight by the action of an acid, an oxidizer, an enzyme, or some combination of these on the polymer itself. In the case of borate-crosslinked gels, increasing the pH and therefore increasing the effective concentration of the active crosslinker, the borate anion, reversibly create the borate crosslinks. Lowering the pH can just as easily eliminate the borate/polymer bonds. At a high pH above 8, the borate ion exists and is available to crosslink and cause gelling. At lower pH, the borate is tied up by hydrogen and is not available for crosslinking, thus gelation by borate ion is reversible.

Embodiments may also include proppant particles that are substantially insoluble in the fluids of the formation. Proppant particles carried by the treatment fluid remain in the fracture created, thus propping open the fracture when the fracturing pressure is released and the well is put into production. Suitable proppant materials include, but are not limited to, sand, walnut shells, sintered bauxite, glass beads, ceramic materials, naturally occurring materials, or similar materials. Mixtures of proppants can be used as well. If sand is used, it will typically be from about 20 to about 100 U.S. Standard Mesh in size. With synthetic proppants, mesh sizes about 8 or greater may be used. Naturally occurring materials may be underived and/or unprocessed naturally occurring materials, as well as materials based on naturally occurring materials that have been processed and/or derived. Suitable examples of naturally occurring particulate materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc. including such woods that have been processed by grinding, chipping, or other form of particulation, processing, etc. Further information on nuts and composition thereof may be found in ENCYCLOPEDIA OF CHEMICAL TECHNOLOGY, Edited by Raymond E. Kirk and Donald F. Othmer, Third Edition, John Wiley & Sons, vol. 16, pp. 248-273, (1981).

The concentration of proppant in the fluid can be any concentration known in the art, and will preferably be in the range of from about 0.03 to about 3 kilograms of proppant added per liter of liquid phase. Also, any of the proppant particles can further be coated with a resin to potentially improve the strength, clustering ability, and flow back properties of the proppant.

A fiber component may be included in the fluids to achieve a variety of properties including improving particle suspension, and particle transport capabilities, and gas phase stability. Fibers used may be hydrophilic or hydrophobic in nature, but hydrophilic fibers are preferred. Fibers can be any fibrous material, such as, but not necessarily limited to, natural organic fibers, comminuted plant materials, synthetic polymer fibers (by non-limiting example polyester, polyamide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) Fibers available from Invista Corp. Wichita, Kans., USA, 67220. Other examples of useful fibers include, but are not limited to, polylactic acid polyester fibers, polyglycolic acid polyester fibers, polyvinyl alcohol fibers, and the like. When used in fluids, the fiber component may be included at concentrations from about 1 to about 15 grams per liter of the liquid phase of the fluid, preferably the concentration of fibers are from about 2 to about 12 grams per liter of liquid, and more preferably from about 2 to about 10 grams per liter of liquid.

Embodiments may further use fluids containing other additives and chemicals that are known to be commonly used in oilfield applications by those skilled in the art. These include, but are not necessarily limited to, materials such as surfactants in addition to those mentioned hereinabove, breaker aids in addition to those mentioned hereinabove, oxygen scavengers, alcohol stabilizers, scale inhibitors, corrosion inhibitors, fluid-loss additives, bactericides and biocides such as 2,2-dibromo-3-nitrilopropionamine or glutaraldehyde, and the like. Also, they may include a co-surfactant to optimize viscosity or to minimize the formation of stable emulsions that contain components of crude oil.

As used herein, the term "alcohol stabilizer" is used in reference to a certain group of organic molecules substantially or completely soluble in water containing at least one hydroxyl group, which are susceptible of providing thermal stability and long term shelf life stability to aqueous zirconium complexes. Examples of organic molecules referred as "alcohol stabilizers" include but are not limited to methanol, ethanol, n-propanol, isopropanol, n-butanol, tert-butanol, ethyleneglycol monomethyl ether, and the like.

The fluids and/or methods may be used for hydraulically fracturing a subterranean formation. Techniques for hydraulically fracturing a subterranean formation are known to persons of ordinary skill in the art, and involve pumping a fracturing fluid into the borehole and out into the surrounding formation. The fluid pressure is above the minimum in situ rock stress, thus creating or extending fractures in the formation. See Stimulation Engineering Handbook, John W. Ely, Pennwell Publishing Co., Tulsa, Okla. (1994), U.S. Pat. No. 5,551,516 (Normal et al.), "Oilfield Applications," Encyclopedia of Polymer Science and Engineering, vol. 10, pp. 328-366 (John Wiley & Sons, Inc. New York, N.Y., 1987) and references cited therein.

In various embodiments, hydraulic fracturing involves pumping a proppant-free viscous fluid, or pad—usually water with some fluid additives to generate high viscosity—into a well faster than the fluid can escape into the formation so that the pressure rises and the rock breaks, creating artificial fractures and/or enlarging existing fractures. Then, proppant particles are added to the fluid to form slurry that is pumped into the fracture to prevent it from closing when the pumping pressure is released. In the fracturing treatment, fluids of are used in the pad treatment, the proppant stage, or both.

In some of the following examples, a microwave crosslinking temperature test was used to determine crosslinking onset temperatures. In this procedure, 250 ml of sample solution were placed in a 400 ml glass beaker, heated in a 700 watt microwave for 10 seconds, removed from the microwave and stirred with a digital thermometer. If the stirring did not indicate a viscosity build-up adequate to show a first lip, the solution was returned to the microwave and heated for another 5 seconds and removed for another stir test. The heating was repeated until the stirring indicated a viscosity buildup, and then the beaker was tilted to determine if there was a first lip, i.e. the fluid was sufficiently elastic for a small, finger-sized lip to form and be retracted back into the beaker upon tilting in the opposite direction. The temperature recorded on the digital thermometer corresponding to the first lip can be taken as the crosslinking onset temperature for the purposes.

Example 1

Preparation of Zr-Glutamic Acid Crosslinker. Zirconium oxychloride octahydrate (2.05 g) was slowly dissolved in 8 g of water. Glutamic acid (1.85 g) was added to the resulting solution under constant stirring. Next, 8 g of triethylamine (TEA) were added drop-wise over a period of 5 minutes. The resulting mixture was stirred for about 30 minutes until all the components were fully dissolved. The crosslinker was aged overnight in an oven at 51.5° C. (125° F.) to produce a slightly yellow, transparent solution.

Example 2

Crosslinking carboxymethylhydroxypropylguar (CMHPG) with Zr-lactate (comparative). CMHPG (3.6 g) was dissolved in 1 liter of aqueous 0.1 volume percent tetramethyl ammonium chloride (TMAC). After hydrating the polymer for about 30 minutes, 1.5 ml of tetraethylenepentamine (TEPA) were added so the resulting pH of the fluid was in the range of 10.4-10.5. A commercially available Zr-lactate crosslinker was added to the fluid at room temperature at a concentration of Zr in the final composition of about 50 ppm. Gelation occurred instantaneously upon addition of the crosslinker.

Example 3

CMHPG crosslinking with Zr-glutamic acid complex. CMHPG (3.6 g) was dissolved in 1 liter aqueous 0.1 volume percent TMAC, hydrated for about 30 minutes and basified with TEPA as in Example 2. The Zr-glutamic acid complex solution of Example 1 (1.6 ml) was added to the fluid in the same manner as in Example 2 at room temperature to make the concentration of Zr in the resulting composition about 50 ppm. In contrast to Example 2, however, no immediate gelation was observed. The fluid was heated according to the microwave procedure described above, and the crosslinking temperature was determined to be 65° C.

Example 4

Effect of higher proportion of Zr-glutamic acid complex. Example 3 was repeated except that 2 ml of the Zr-glutamic acid complex example 1 was added to the fluid. There was no immediate gelation and the crosslinking temperature was determined by the microwave heating procedure to be 62° C. The prepared fluid was also run on a FANN50 rheometer at 100 s$^{-1}$ and 135° C. for 2.5 hours, and the rheology profile seen in FIG. 1 shows a thermally stable gel with a delayed crosslink

Example 5

Figure 2:
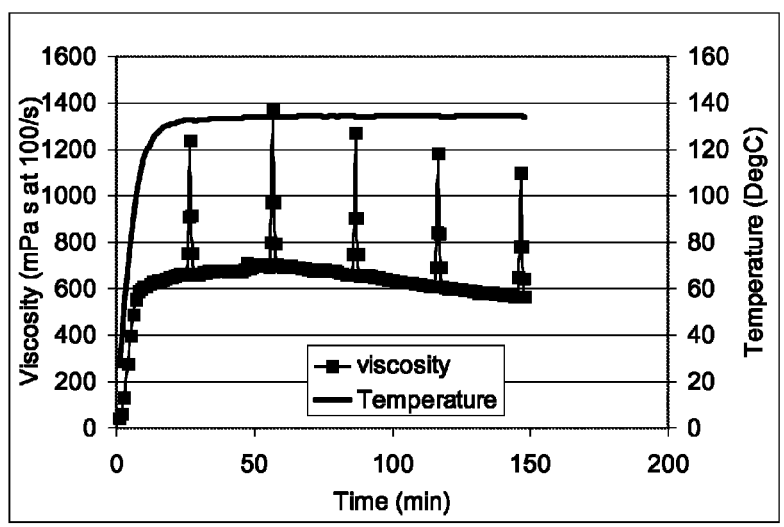
FIG. 2 shows the rheology profile of a fluid crosslinked with 2.5 ml/L zirconium-glutamic acid crosslinker solution according to the embodiment described in Example 5.

Effect of higher proportion of Zr-glutamic acid complex. The procedure of Examples 3-4 was repeated except that 2.5 ml of the Zr-glutamic acid complex of Example 1 was added to the fluid. There was no immediate gelation and the crosslinking temperature was determined by the microwave heating procedure to be 61° C. The prepared fluid was also run on a FANN50 rheometer at 100 s$^{-1}$ and 135° C. for 2.5 hours, and the rheology profile seen in FIG. 2 shows that the crosslinker concentration can be increased to controllably adjust the viscosity without significantly impacting the crosslinking temperature or crosslink delay. This example shows a substantial viscosity increase over the previous example using less crosslinker.

Example 6

Preparation of B—Zr-Glutamic Acid Crosslinker. Zirconium oxychloride octahydrate (6.8 g) was slowly dissolved in 24 g of water. Then, 6.2 g of glutamic acid were added to the resulting solution under constant stirring, followed by 8 g of borax and 26 g of triethanolamine (TEA). The resulting mixture was stirred for about 30 minutes until all the components were fully dissolved. The crosslinker was aged overnight at 51.5° C. in the oven to produce a slightly yellow transparent solution.

Example 7

Figure 3:
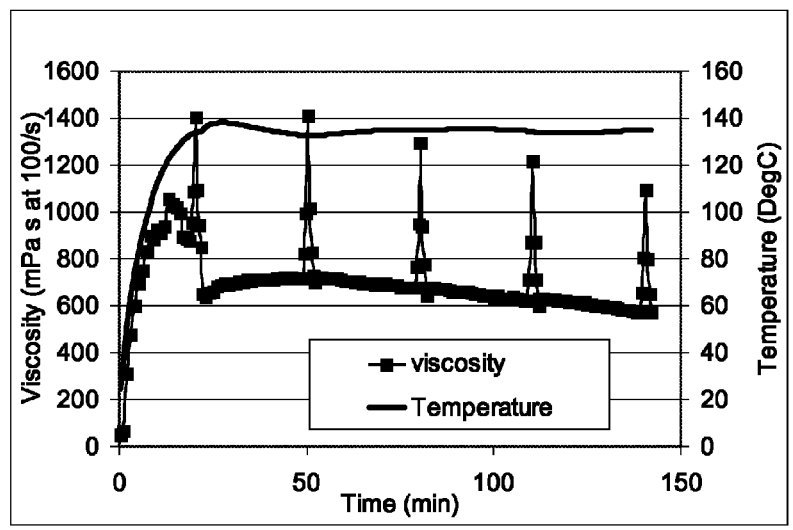
FIG. 3 shows the rheology profile of a fluid crosslinked with boron-zirconium-glutamic acid crosslinker solution according to an embodiment described in Example 7.

CMHPG crosslinking with B—Zr-glutamic acid complex. CMHPG (3.6 g) was dissolved in 1 liter aqueous 0.1 volume percent TMAC, hydrated for about 30 minutes and basified with TEPA as in Example 2. The B—Zr-glutamic acid crosslinker solution of Example 6 (2 ml) was added and the fluid was run on a FANN50 rheometer at 100 s$^{-1}$ and 135° C. for 140 minutes. The rheology profile seen in FIG. 3 shows that there is no interference from the addition of boron to the Zr-glutamic crosslinked gel.

Examples 8 and 9

Figure 4:
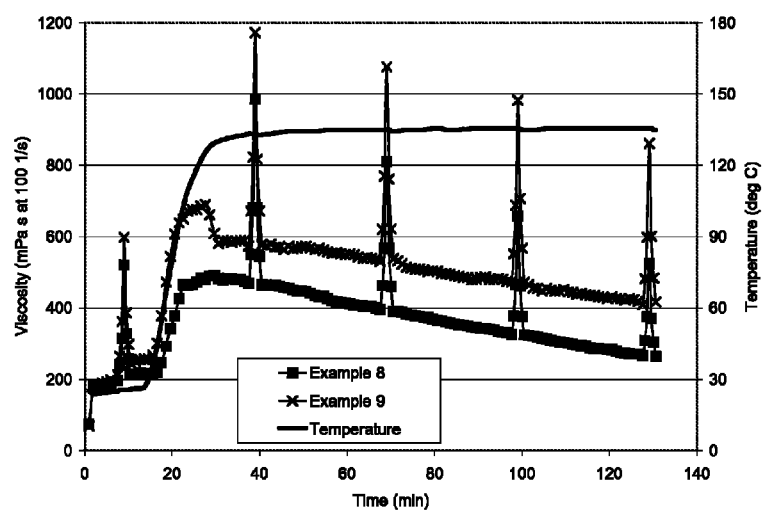
FIG. 4 shows the rheology profile of fluids crosslinked in the presence of a surfactant with boron-zirconium-aspartic acid crosslinker and boron-zirconium-glutamic acid crosslinker according to embodiments described in Examples 8 and 9, respectively.

CMHPG was similarly crosslinked in the presence of 0.05% benzyl cocoalkyl dimethyl quaternary ammonium chloride (DMCB) surfactant (ARQUAD DMCB-80) with two different zirconium crosslinkers. The compositions used were 0.36% CMHPG, 0.15% TEPA, 0.025% sodium tetraborate decahydrate, 0.2% TMAC, 0.05% DMCB, and 0.16% B—Zr-ligand crosslinker. In Example 8 the crosslinker contained 32.9 ppm Zr with aspartic acid and triethanolamine ligands in a 0.1% solution; in Example 9 32.7 ppm Zr with glutamic acid and triethanolamine ligands. The rheology profiles seen in FIG. 4 show that the use of the surfactant works with both glutamic acid and aspartic acid crosslinker ligands to provide continuous viscosification without significant viscosity loss.

Examples 10-26

Additional zirconium-ligand complexes were similarly evaluated to determine the crosslinking temperatures using the microwave test procedure described above. In each of these examples, the second ligand was triethanolamine (TEA), the fluids used 0.36 g/L (30 ppt) polymer, and the pH was adjusted with TEPA and the reported values were taken after addition of the crosslinker solution at ambient temperature, before crosslinking occurred. For similar runs where the only difference was the initial pH, the pH sensitivity slope ($\Delta°$ C./$\Delta$pH) was calculated based on the highest and lowest pH runs. The results are summarized in Table 1.

Figure 5:
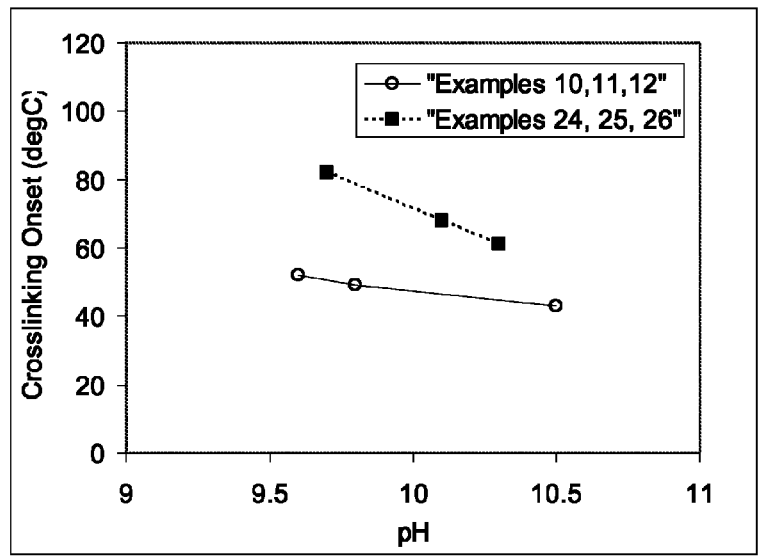
FIG. 5 shows the crosslinking temperature as determined by the microwave testing procedure as a function of pH according to an embodiment as described in Examples 10, 11, 12, 24, 25 and 26.

The data in Table 1 show that various amino acids allow the crosslinker to be selected for use at a pH suitable with boron as an early crosslinker, with a desirable crosslinking temperature and most with low pHSS values. At the pH conditions tested, zirconium crosslinker prepared with bicine ligands yielded crosslinking temperatures above 60° C. and pHSS values of 35° C. FIG. 5 shows the crosslinking temperature as determined by the microwave testing procedure as a function of pH according to an embodiment as described for Examples 10, 11, 12, 24, 25 and 26.

TABLE 1

Summary of Crosslinking Temperatures and pH's for Zr-ligand complexes

| Example | Ligand | Molar ratio Ligand:Zr | Molar ratio TEA:Zr | Fluid type | pH | Crosslinking Onset (° C.) | pHHS (° C./$\Delta$pH) |
|---|---|---|---|---|---|---|---|
| 10 | D,L- | 1:1 | 8:1 | cationic | 10.5 | 43 | 10 |
| 11 | Alanine | | | guar | 9.8 | 49 | |
| 12 | | | | | 9.6 | 52 | |
| 13 | D,L- | 1:1 | 8:1 | CMHPG | 10.1 | 46 | |
| 14 | Alanine | 1.5:1 | | | 10.5 | 43 | |
| 15 | | 2.2:1 | | | 10.4 | 47 | |
| 16 | D,L- | 2:1 | 4:1 | CMHPG | 10.1 | 45 | 14 |
| 17 | Alanine | | | | 9.7 | 52 | |
| 18 | | | | | 9.6 | 52 | |
| 19 | D,L- | 2:1 | 7:1 | CMHPG | 9.9 | 43 | 30 |
| 20 | Aspartic acid | | | | 10.1 | 49 | |
| 21 | D,L- Aspartic acid | 1:1 | 8:1 | CMHPG | 10.4 | 49 | |
| 22 | β-Alanine | 3:1 | 7:1 | cationic guar | 10.4 | 46 | |
| 23 | D-Glutamic acid | 1:1 | 7:1 | cationic guar | 9.7 | 52 | |
| 24 | Bicine | 2:1 | 7:1 | cationic guar | 10.1 | 68 | 35 |
| 25 | | | | | 9.7 | 82 | |
| 26 | | | | | 10.3 | 61 | |

Example 27

Preparation of Zr-Phosphonoacetic Acid Crosslinker. Zirconium oxychloride octahydrate (2 g) was slowly dissolved in 10 g of water. Phosphonoacetic acid (0.85 g) was added to the resulting solution under constant stirring. Phosphonoacetic acid was followed by 8.8 g of triethanolamine (TEA) added drop-wise over a period of 5 minutes. The resulting mixture was stirred for about 30 minutes until all the components were fully dissolved. The crosslinker was aged overnight at 51.5° C. (125° F.) in the oven to produce a slightly yellow, transparent solution.

Example 28

Figure 6:
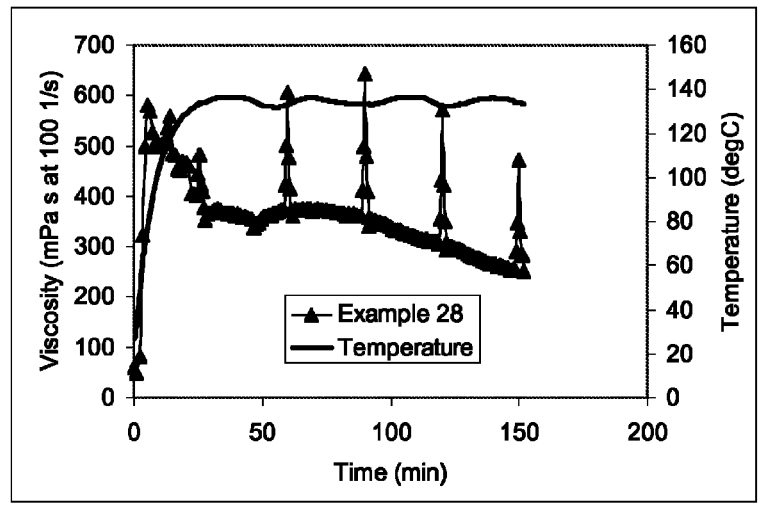
FIG. 6 shows the rheology profile of fluids crosslinked in the presence of a surfactant with zirconium-phosphonoacetic acid crosslinker according to embodiments described in Example 8.

Crosslinking of cationic guar. A cationic guar derivative (3.6 g) was dissolved in 1 liter of 0.1% vol. water solution of tetramethyl ammonium chloride (TMAC). After hydrating the polymer for about 30 minutes, 1.5 ml of tetraethylenepentamine (TEPA) were added so the resulting pH of the fluid was in the range of 10.4-10.5. The fluid pH was then adjusted to 9.8 with a few drops of 10% HCl. Two ml of Zr-phosphonoacetic acid crosslinker prepared according to example 27 were added to the fluid. To determine the crosslinking temperature the fluid was heated in a microwave according to the procedure described above. The crosslinking temperature was determined to be 55° C. The fluid was also run on a FANN50 rheometer at 100/sec and 135° C. for 2.5 hours. The rheology profile seen in FIG. 6 shows that the crosslinking temperature of cationic guar, which is generally more reactive than CMHPG to zirconium, can be sufficiently raised with the selection of a strong binding ligand, resulting in a thermally stable gel.

Although various embodiments have been described with respect to enabling disclosures, it is to be understood the invention is not limited to the disclosed embodiments. Variations and modifications that would occur to one of skill in the art upon reading the specification are also within the scope of the invention, which is defined in the appended claims.

We claim:

1. A method of treating a subterranean formation penetrated by a well bore, the method comprising:
    mixing into an aqueous mixture a crosslinkable, hydratable polymer and a delayed crosslinking agent, in amounts effective to obtain an aqueous mixture that can form a persistent gel at a crosslinking condition comprising an onset temperature of from 40° C. to 60° C., the aqueous mixture being formed at a pH where a pH sensitivity slope of 5° C. per pH unit to 25° C. per pH unit can be observed for at least one pH unit range within a pH range from 8.5 to 12.5, wherein
    the pH sensitivity slope (pHSS) is calculated according to the following formula:

$$pHSS = |(T_{XL1} - T_{XL2})/(pH_2 - pH_1)|$$

where $pH_1$ and $pH_2$ are and higher pH values, respectively, and $T_{XL1}$ and $T_{XL2}$ are the corresponding crosslinking temperatures for the respective pH value, and
    the crosslinking agent comprises a complex comprising
        a metal,
        a first ligand selected from the group consisting of amino acids, phosphono acids, and salts or derivatives thereof, and a second ligand selected from the group consisting of alkanolamines, alkoxides, and α-hydroxyacid derivatives, wherein a molar ratio of the metal to the first ligand is from 1:1 to about 1:6, and a molar ratio of the metal to the second ligand is from 1:1 to about 1:10;

injecting the aqueous mixture into the well bore; and gelling the aqueous mixture at the persistent crosslinking condition.

2. The method of claim 1, wherein the complex comprises a Group 4 metal.

3. The method of claim 1 wherein the persistent crosslinking condition comprises a pH between 10 and 10.5.

4. The method of claim 1 further comprising adjusting the pH of the aqueous mixture by introducing a pH adjusting compound to control an onset temperature at which the gelling occurs.

5. The method of claim 1 wherein the first ligand has from 2 to 40 carbon atoms and comprises an α-amino acid, an α-amino acid derivative, or a salt of an α-amino acid of the formula:

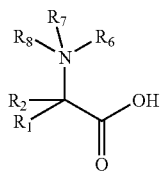

wherein $R_1$ and $R_2$ are independently selected from hydrogen and hydrocarbyl optionally containing a heteroatom, or together can form a substituted or unsubstituted cycloaliphatic bridge optionally containing a heteroatom;

wherein $R_6$ is hydrogen or a lone electron pair; and wherein $R_7$ and $R_8$ are independently selected from hydrogen and substituted or unsubstituted aliphatic hydrocarbyl, or with one of $R_1$ and $R_2$ can form a substituted or unsubstituted cycloaliphatic bridge optionally containing a heteroatom.

6. The method of claim 5 with the proviso that when both $R_1$ and $R_2$ are hydrogen, $R_7$ and $R_8$ are selected from hydrogen and substituted or unsubstituted aliphatic hydrocarbyl other than hydroxyalkyl.

7. The method of claim 5 wherein $R_7$ and $R_8$ are both hydrogen.

8. The method of claim 5 wherein at least one of $R_1$ and $R_2$ is carboxyalkyl.

9. The method of claim 1 wherein the first ligand is derived from aspartic acid, glutamic acid or a combination thereof.

10. The method of claim 1 wherein the first ligand has from 3 to 40 carbon atoms and comprises a β-amino acid, a β-amino acid derivative or a salt of a β-amino acid of the formula:

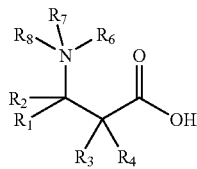

wherein $R_1$ and $R_2$ are independently selected from hydrogen and hydrocarbyl optionally containing a heteroatom, or together can form a substituted or unsubstituted cycloaliphatic bridge optionally containing a heteroatom;

wherein $R_3$ and $R_4$ are independently selected from hydrogen and hydrocarbyl;

wherein $R_6$ is hydrogen or a lone electron pair; and wherein $R_7$ and $R_8$ are independently selected from hydrogen and substituted or unsubstituted aliphatic hydrocarbyl.

11. The method of claim 1 wherein the first ligand is derived from beta-alanine.

12. The method of claim 1 wherein the first ligand has from 2 to 40 carbon atoms and comprises a phosphono carboxylic acid, a phosphono carboxylic acid derivative or a salt of a phosphono carboxylic acid of the formula:

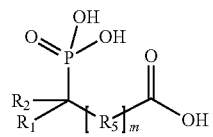

wherein $R_1$ and $R_2$ are independently selected from hydrogen and hydrocarbyl optionally containing a heteroatom, or together can form a substituted or unsubstituted cycloaliphatic bridge optionally containing a heteroatom; and wherein m is 0 or 1 and when m is 1, $R_5$ is substituted or unsubstituted aliphatic alkylene.

13. The method of claim 1 wherein the first ligand is derived from phosphonoacetic acid.

14. The method of claim 1 wherein the metal is titanium or zirconium.

15. The method of claim 1 wherein the metal is a Group 4 metal, which is present in a concentration between 10 and 500 ppm by weight of the liquid phase of the aqueous mixture.

16. The method of claim 1 wherein the crosslinkable polymer is selected from the group consisting of polysaccharides.

17. The method of claim 1 wherein the crosslinkable polymer is selected from the group consisting of ionically modified galactomannan, cellulose and starch.

18. The method of claim 1 further comprising introducing proppant into the aqueous mixture.

19. The method of claim 1, further comprising introducing into the aqueous mixture a borate crosslinker for reversible crosslinking at a temperature below 40° C.

20. The method of claim 19 further comprising introducing a clay stabilizer and a surfactant into the aqueous mixture.

21. The method of claim 20 wherein the polymer is ionically modified to introduce a cationic or anionic moiety and the surfactant comprises an oppositely charged moiety.

22. The method of claim 19 further comprising introducing tetramethyl ammonium chloride and a surfactant into the aqueous mixture.

23. A method of treating a subterranean formation comprising:

mixing a crosslinkable, hydratable polymer and a crosslinking agent in an aqueous medium in amounts effective to form a gel having a rheology profile comprising:

reversible shear viscosity recovery at a first condition comprising a temperature below 40° C.; and a shear-sensitive persistent viscosity at a second condition comprising an elevated temperature with respect to the first condition, wherein the crosslinking agent comprises:

i. a borate source and ii. a complex of a Group 4 metal, and a first ligand selected from the group consisting of amino and phosphono carboxylic acids, and salts and derivatives thereof, and a second ligand selected from the group consisting of alkanolamines, alkoxides, and α-hydroxyacid derivatives, wherein a molar ratio of the Group 4 metal to the first ligand is from 1:1 to about 1:6, and a molar ratio of the Group 4 metal to the second ligand is from 1:1 to about 1:10;

gelling the aqueous mixture at the first condition temperature; and injecting the aqueous mixture to transport the proppant into a fracture in the subterranean formation, wherein the subterranean formation has a temperature meeting the second condition, and wherein the first condition comprises a temperature above 10° C. and below 40° C., and a pH range from 8.5 to 12.5, and wherein the second condition comprises a crosslinking onset temperature from 40° C. to 60° C., and a mixture that is at pH where a pH sensitivity slope of 5° C. per pH unit to 25° C. per pH unit can be observed for at least one pH unit range within the pH range from heating the aqueous mixture from the first condition, the pH sensitivity slope (pHSS) being calculated according to the following formula:

$$pHSS=|(T_{XL1}-T_{XL2})/(pH_2-pH_1)|$$

where $pH_1$ and $pH_2$ are and higher pH values, respectively, and $T_{XL1}$ and $T_{XL2}$ are the corresponding crosslinking temperatures for the respective pH value.

24. The method of claim 23 comprising continuously maintaining viscosity of the mixture from the first condition to the second condition without viscosity loss other than from reversible shear losses.

25. The method of claim 23 wherein the first condition occurs in the wellbore during the injection and the second condition occurs near exit from the wellbore.

26. A method of treating a well bore penetrating a subterranean formation comprising the steps of:

mixing into an aqueous mixture a crosslinkable, hydratable polymer and a delayed crosslinking agent,
wherein the crosslinking agent comprises a complex comprising
a Group 4 metal,
a first ligand, and
a second ligand selected from the group consisting of alkanolamines, alkoxides, and α-hydroxyacid derivatives, the first ligand having from 4 to 40 carbon atoms and comprising an α-amino acid, an α-amino acid derivative, or a salt of an α-amino acid of the formula:

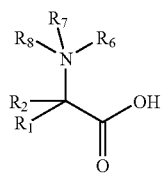

wherein $R_1$ and $R_2$ are independently selected from hydrogen and hydrocarbyl optionally containing a heteroatom, or together can form a substituted or unsubstituted cycloaliphatic bridge optionally containing a heteroatom;

wherein $R_6$ is hydrogen or a lone electron pair;

wherein $R_7$ and $R_8$ are independently selected from hydrogen and substituted or unsubstituted aliphatic hydrocarbyl, or together can form a substituted or unsubstituted cycloaliphatic bridge optionally containing a heteroatom, or wherein one of $R_7$ and $R_8$ and one of $R_1$ and $R_2$ together can form a substituted or unsubstituted cycloaliphatic bridge optionally containing a heteroatom; and wherein at least one of $R_1$, $R_2$, $R_7$ and $R_8$ is substituted with a carboxy group; and wherein a molar ratio of the Group 4 metal to the first ligand is from 1:1 to about 1:6, a molar ratio of the Group 4 metal to the second ligand is from 1:1 to about 1:10, and the crosslinkable, hydratable polymer and the delayed crosslinking agent are mixed in amounts effective to obtain an aqueous mixture that can form a persistent gel at a crosslinking condition comprising an onset temperature of from 40° C. to 60° C., the aqueous mixture being formed at a pH where a pH sensitivity slope of 5° C. per pH unit to 25° C. per pH unit can be observed for at least one pH unit range within a pH range from 8.5 to 12.5, the pH sensitivity slope (pHSS) being calculated according to the following formula:

$$pHSS=|(T_{XL1}-T_{XL2})/(pH_2-pH_1)|$$

where $pH_1$ and $pH_2$ are and higher pH values, respectively, and $T_{XL1}$ and $T_{XL2}$ are the corresponding crosslinking temperatures for the respective pH value;

injecting the aqueous mixture into the well bore;
gelling the aqueous mixture.

27. A method of treating a well bore penetrating a subterranean formation, the method comprising:

mixing into an aqueous mixture a crosslinkable, hydratable polymer and a delayed crosslinking agent, wherein the crosslinking agent comprises a complex comprising
a Group 4 metal,
a first ligand, and
a second ligand selected from the group consisting of alkanolamines, alkoxides, and α-hydroxyacid derivatives, the first ligand having from 4 to 40 carbon atoms and comprising an α-amino acid, an α-amino acid derivative, or a salt of an α-amino acid of the formula:

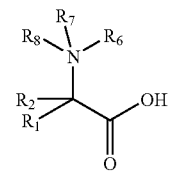

wherein $R_1$ and $R_2$ are independently selected from hydrogen and hydrocarbyl optionally containing a heteroatom, or together can form a substituted or unsubstituted cycloaliphatic bridge optionally containing a heteroatom;

wherein $R_6$ is hydrogen or a lone electron pair;

wherein $R_7$ and $R_8$ are independently selected from hydrogen and substituted or unsubstituted aliphatic hydrocarbyl other than hydroxyalkyl, or together can form a substituted or unsubstituted cycloaliphatic bridge optionally containing a heteroatom, or wherein one of $R_7$ and $R_8$ and one of $R_1$ and $R_2$ together can form a substituted or unsubstituted cycloaliphatic bridge optionally containing a heteroatom;

injecting the aqueous mixture into the well bore;
gelling the aqueous mixture wherein a molar ratio of the Group 4 metal to the first ligand is from 1:1 to about 1:6, a molar ratio of the Group 4 metal to the second ligand is from 1:1 to about 1:10, and the crosslinkable, hydratable polymer and the delayed crosslinking agent are mixed in amounts effective to obtain an aqueous mixture that can form a persistent gel at a crosslinking condition comprising an onset temperature of from 40° C. to 60° C., the aqueous mixture being formed at a pH where a pH sensitivity slope of 5° C. per pH unit to 25° C. per pH unit can be observed for at least one pH unit range within a pH range from 8.5 to 12.5, the pH sensitivity slope (pHSS) being calculated according to the following formula:

$$pHSS = |(T_{XL1} - T_{XL2})/(pH_2 - pH_1)|$$

where $pH_1$ and $pH_2$ are and higher pH values, respectively, and $T_{XL1}$ and $T_{XL2}$ are the corresponding crosslinking temperatures for the respective pH value.

* * * * *